ously

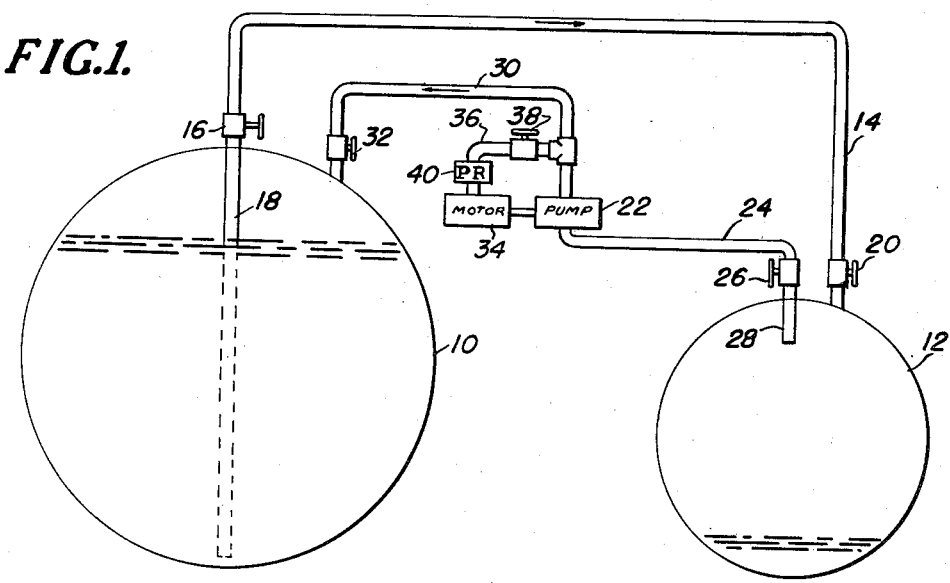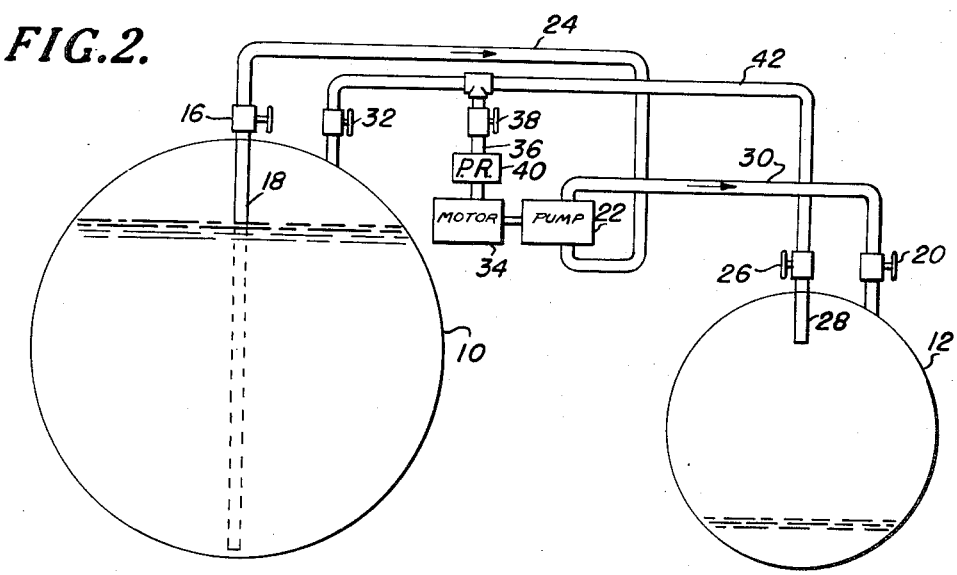

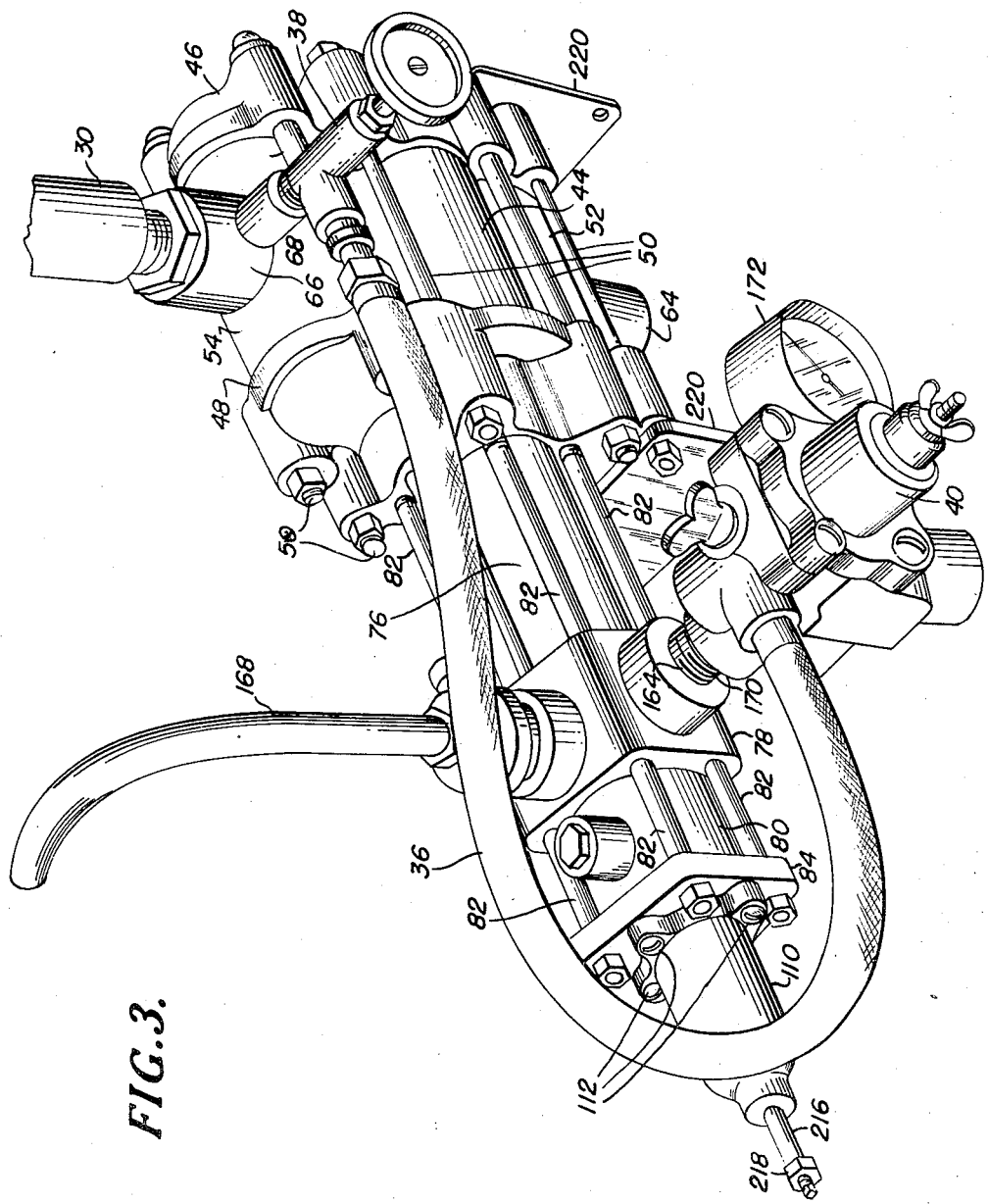

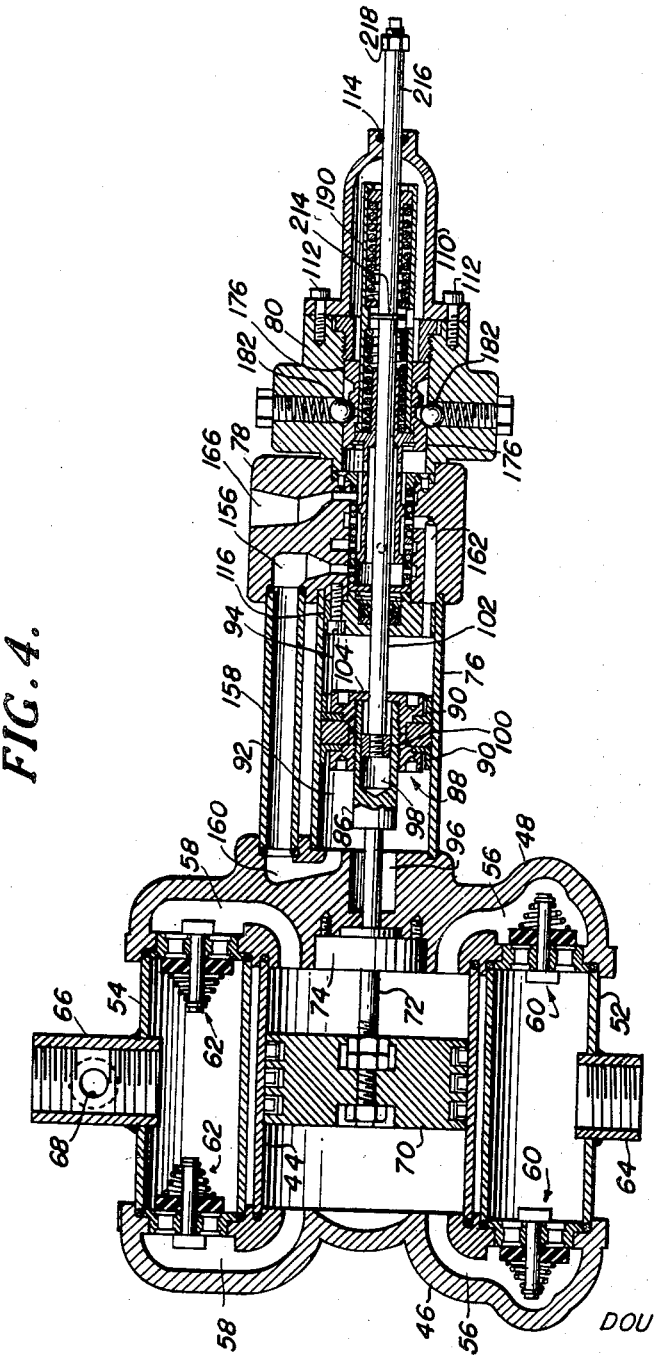

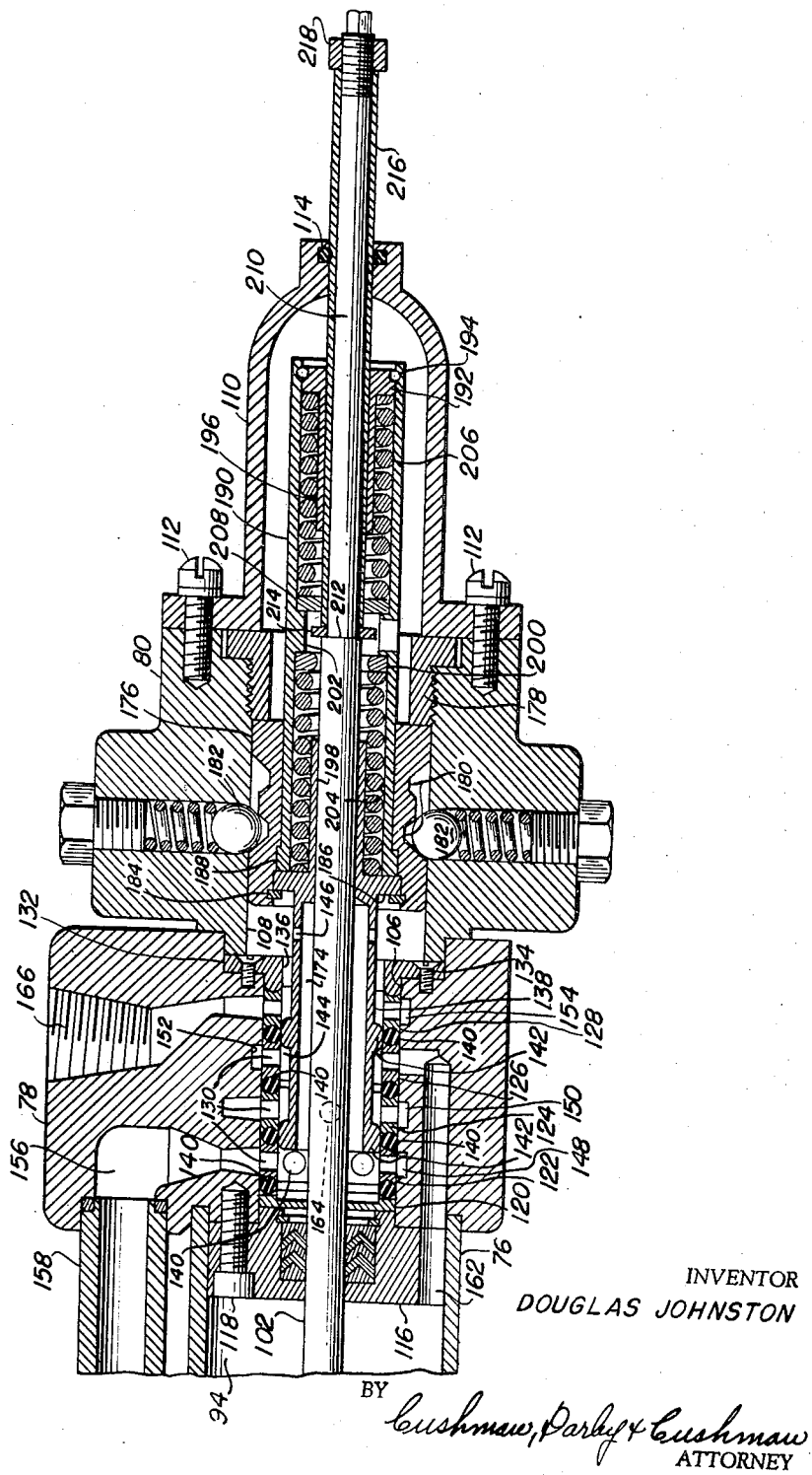

United States Patent Office 2,854,826
Patented Oct. 7, 1958

2,854,826

METHOD AND SYSTEM FOR TRANSFERRING A PRESSURIZED NORMALLY GASEOUS LIQUID

Douglas Johnston, Huntsville, Ala., assignor to John Blue Company, Incorporated, Huntsville, Ala., a corporation of Alabama Application January 12, 1955, Serial No. 481,318

9 Claims. (Cl. 62—55)

This invention relates to an improved method, system, and apparatus for transferring a pressurized normally-gaseous liquid from one container to another. The invention will be described with respect to anhydrous ammonia, but it will be realized that the invention is equally applicable to other pressurized normally-gaseous liquids, such as liquefied petroleum gases.

In recent years, anhydrous ammonia has become of increasing importance as a fertilizer which is applied to the soil by means of cultivator-like applicators or subsoil tools. Anhydrous ammonia usually is supplied to such tools from a large tank, of the order of 100 to 150 gallon capacity, that is supported on a tractor or a tractor-drawn vehicle which carries the earth-working tools. The supply tank is replenished with anhydrous ammonia in the field from a larger storage or field tank, e. g., of the order of 500 to 1000 gallons or more capacity, which is transported on a truck or a trailer.

The transfer of anhydrous ammonia from a field tank to an applicator or supply tank by gravity flow is impractical, because both tanks are supported on substantially the same level and their large bulk and weight substantially preclude moving even the smaller supply tank into a position on a lower level than the field tank. Because gravity-flow transfer of anhydrous ammonia is impractical, two methods of transfer have been employed. One may be called the "bleeding" system, while the other may be called the "pumping" system.

In the bleeding system, a transfer line, usually a hose, is connected to the field tank below the liquid level therein and to the supply tank. Thereupon, ammonia gas existing above the liquid in the supply tank is bled off to the atmosphere until the gas pressure existing in the supply tank is less than that in the field tank. Thereupon, the differential pressure in the field tank forces liquid anhydrous ammonia through the transfer line into the supply tank. This method of transferring anhydrous ammonia has several disadvantages. First of all, there is a relatively large loss of anhydrous ammonia in gas form, which may amount to as much as 10% of the total quantity of anhydrous ammonia transferred from a field tank to a supply tank. Also, the rate of transfer by the bleeding system is relatively slow, and the time required to fill a 150 gallon supply tank to the usual 85% safe level may take from 10 to 20 minutes. Moreover, the bleeding of a relatively large quantity of anhydrous ammonia into the atmosphere is very likely to defoliate a large area of the crop in the immediate vicinity, depending upon atmospheric and wind conditions. Additionally, the escape of such a large quantity of ammonia into the atmosphere is apt to be quite irritating to nearby persons.

The pumping method of transferring anhydrous ammonia involves the connection of a liquid pump into a transfer line, which pump usually is driven by a small internal combustion engine. At the same time, the vapor-spaces of the two tanks are connected together by a pressure-equalizing conduit. Although the transfer of anhydrous ammonia by this method is relatively fast, an internal combustion engine is apt to be difficult to handle as well as rather balky and difficult to start in cold weather. Furthermore, the initial cost of an internal combustion engine is not insignificant, while its operation requires the use of relatively expensive fuel.

Accordingly, it is an object of this invention to provide an improved method and system for transferring a pressurized, normally-gaseous liquid from one container to another.

It is another object of this invention to provide a novel method and system for transferring a pressurized, normally-gaseous liquid from one container to another which makes optimum use of the potential energy available in the gas existing above the liquid level in at least one of the tanks.

It is another object of this invention to provide a novel method and system for rapidly transferring a pressurized, normally-gaseous liquid from one tank to another which uses the potential energy in the gas existing above the liquid level in at least one of the tanks and results in a loss of liquid less than 1% of the total amount transferred.

It is another object of this invention to provide novel, efficient and relatively inexpensive apparatus for effecting the transfer of a pressurized normally-gaseous liquid in accordance with methods and systems embodying this invention.

Other objects and advantages of the invention will be evident from the following description and accompanying drawings, in which:

Figure 1 is a diagrammatic view illustrating a transfer system embodying this invention.

Figure 2 is a diagrammatic view corresponding to Figure 1, but illustrating a modified transfer system embodying this invention.

Figure 3 is a perspective view of a combined fluid pressure motor and pump embodying this invention.

Figure 4 is a longitudinal vertical sectional view of the apparatus shown in Figure 3.

Figure 5 is an enlarged fragmentary view of a portion of Figure 4.

As previously described, the bleeding method of transferring a pressurized, normally-gaseous liquid from one tank to another results in a considerable loss of the liquid in gaseous form. The gas so lost, however, has a considerable quantity of potential energy, so only a portion of such gas when its energy is utilized efficiently in accordance with this invention will serve to transfer the same quantity of liquid at a greater rate or speed of transfer. It follows that gas losses incurred in a transfer in accordance with this invention are much smaller than those incurred in the bleeding method.

Thus, for example, if the vapor or gas pressure in the tanks is one hundred pounds per square inch, each pound of gas, above the liquid in the tanks, occupies about three cubic feet. If then by the bleeding system a liquid-transferring pressure differential is developed between the two tanks, and such pressure differential is maintained at about ten pounds per square inch, then the total energy that can be utilized for the actual transfer by exhausting each pound (3 cubic feet) of gas to the atmosphere is approximately forty three hundred foot pounds. If, however, three cubic feet of the gas at one hundred pounds per square inch gauge pressure is utilized for operating an efficient pump, forty three thousand foot pounds of energy are made available for effecting the liquid transfer. In other words, if the energy available in the pressurized gas existing above the liquid in the tanks is used efficiently, ten times the amount of energy is available as compared to the "bleeding" method. Therefore, on this basis, only one tenth of the gas lost in the bleeding method is required to effect the transfer when such tenth is used for driving an efficient pump. This has been borne out in actual practice.

Referring now to Figure 1 of the drawings, there is shown a preferred system for transferring a pressurized, normally-gaseous liquid from a large storage or field tank 10 to a smaller applicator or supply tank 12 in accordance with this invention. The inlet end of a transfer line 14 is connected to the field tank 10 below the liquid level therein, as by a connection through a conventional valve 16 to the usual eduction tube 18 which depends from the top of the tank 10 to a point closely adjacent the bottom thereof. Normally the outlet end of the transfer line 14 is connected to the supply tank 12 above the liquid level therein through a conventional valve 20, as shown in Figure 1. Although not shown in the drawings, the transfer can also be effected if the outlet end of the transfer line 14 is connected to the supply tank 10 below the liquid level therein. Usually, when a transfer of anhydrous ammonia is to be effected, the field tank 10 is filled to near its capacity with liquid anhydrous ammonia, which capacity is usually about 85% of the total capacity of the tank, because filling a tank with a pressurized, normally-gaseous liquid above this level is undesirable from the standpoint of safety. Of course, above this level the tank 10 is filled with ammonia gas under a relatively high pressure, i. e., of the order of one hundred to two hundred pounds per square inch, depending to a great extent upon the temperature. Similarly, the supply tank 12 is nearly exhausted of liquid and merely has a small quantity thereof in the bottom of the tank while the space above the liquid again is occupied by ammonia in gas form under a relatively high pressure.

An efficient pump 22, which in this instance is used as a gas compressor, has its suction or inlet line 24 connected to the supply tank 12 above the liquid level therein, preferably through a valve 26 and a tube 28 which depends into the tank 12 to a level representing about 85% liquid capacity in order to avoid filling over this level, as later evident. The discharge line 30 of the pump is connected to the field tank 10, preferably above the liquid level therein, through a valve 32. The pump 22 is driven by a fluid pressure motor 34 which is supplied with power fluid in the form of the pressurized gas existing above the liquid level in one of the tanks 10 or 12. Preferably, power fluid is supplied to the motor 34 from the field tank 10 and can be obtained through a power supply line 36 which is connected to the discharge line 30. The supply of power fluid to the motor preferably is controlled by a needle valve 38 connected into the line 36, and an adjustable pressure regulator 40 desirably is connected into the line 36 between the needle valve 38 and the motor 34.

In operation of the above-described transfer system, after the lines 14, 24, and 30, which usually are hoses, have been connected to tanks 10 and 12, the valves 16 and 20 of the transfer line 14 are opened and then the valves 26 and 32 of the pump lines 24 and 30 are opened. Thereupon, the needle valve 38 is slowly opened to supply power fluid to the motor 34 for driving the pump 22. Until the pump 22 builds up a pressure differential between the two tanks 10 and 12, as later described, the motor 34 may tend to "run away." Accordingly, the needle valve 38 is initially opened only a very small amount in order to avoid the aforedescribed running away of the motor 34. The pump 22, however, which acting as a compressor draws gas from the supply tank 12 and pumps it into the field tank 10, rapidly builds up a pressure differential between the two tanks so that the needle valve 38 can be opened to its full extent shortly after the transfer operation is initiated. The pressure regulator 40 is employed to supply the motor 34 with power fluid under a substantially constant pressure in order to maintain a substantially constant rate of transfer of liquid from the field tank 10 to the supply tank 12, as will be described later.

It will be seen that, as the gas pressure in the field tank 10 increases over that in the supply tank 12, the liquid in the field tank will be forced upwardly through the eduction tube 18, through the transfer line 14, and into the supply tank 12. The rate of transfer of liquid from the tank 10 to the tank 12 depends on the gas pressure supplied to the inlet of the motor 34 and also on the size and efficiency of the complete transfer line. If the pressure drop through the valves 16 and 20, tube 18, hose 14 and various fittings comprising the complete line through which liquid is transferred is quite small, the rate of transfer will be correspondingly large. Additionally, the higher the pressure of the power fluid supplied to the motor 34, the greater the speed of operation of the pump 22 with a corresponding rate of transfer of liquid from the field tank 10 to the supply tank 12.

With practically large and efficient complete liquid-transferring lines, it has been found that rates of transfer of over twenty gallons per minute are obtainable with motor inlet pressures of between 50 and 70 pounds per square inch. Generally speaking, however, it is more economical to operate the motor 34 at the lowest practical inlet pressure, since it has been found in actual practice that the consumption of gas by the motor is directly proportional to the motor inlet pressure. For example, it has been found that at 30 pounds per square inch motor inlet pressure, the gas consumption is approximately .0025% of the total liquefied gas transferred, whereas at 70 pounds per square inch motor inlet pressure the gas consumption is .006% of the amount of liquefied gas transferred. These losses occur in the exhaust from the motor 34, but are so small, as compared to those of the bleeding method, that little or no consideration need be given to the effect of the exhaust gas as respects defoliation of crops or as a possible source of irritant to nearby persons.

Referring now to Figure 2 of the drawings, there is shown a modified system of transferring normally-gaseous liquid, e. g., anhydrous ammonia, from a field tank 10 to a supply tank 12. In this system, the pump 22 is utilized as a liquid pump instead of a gas compressor and has its suction line 24 connected through the valve 16 to the eduction tube 18 of the field tank, while the discharge line 30 of the pump is connected through the valve 20 to the supply tank. The vapor or gas spaces of both tanks are connected through the valves 26 and 32 by a pressure-equalizing line 42 and the motor is supplied with power fluid in the form of the pressurized gas existing in both tanks, as by connecting the power supply line 36, together with its needle valve 38 and pressure regulator 40, to the pressure-equalizing line.

In operation of this modified transfer system, after the various lines 24, 30, and 42 have been connected to the tanks, the valves 26 and 32 of the pressure-equalizing line 42 are opened and the valves 16 and 20 of the pump suction and discharge lines 24 and 30 are opened. Thereupon, the needle valve 38 may be opened relatively rapidly because in pumping liquid the pump 22 always operates under load. As the motor 34 operates, the pump 22 pumps liquid from the field tank 10 to the supply tank 12, again at a rate determined mainly by gas inlet pressure to the motor. It will be seen that the pressure-equalizing line 42 is almost essential in order to avoid too great a build-up of pressure in the supply tank 12, which would cause an increasing load on the motor 34 with a corresponding reduction in the rate of transfer of liquid from the field tank 10 to the supply tank 12.

While both of the above transfer systems have been found to be very efficient in actual operation, in that the transfer rate is quite high and the actual amount of gas consumed by the motor 34 in effecting a transfer is from one-tenth to one-twentieth of the gas loss encountered by the "bleeding" system, the system involving the use of the pump 22 as a compressor is preferred to the system involving the use of the pump as an actual liquid pump. The principal reason for such preference is that in quite cold weather the gas pressure in both the field and supply tanks drops below 70 or 80 pounds per square inch, and it has been found in actual practice that at these relatively low gas pressures the direct withdrawal of liquid from the field tank 10 by the pump 22 causes an excessive amount of gas formation in the suction line 24 leading to the pump with a consequent reduction in its volumetric efficiency. Of course, no such difficulty is encountered in utilizing the pump 22 as a compressor, as set forth above with reference to the first-described transfer system.

Referring now to Figures 3, 4, and 5 of the drawings, there is shown therein a combined fluid pressure motor and pump unitary assembly embodying this invention for use in the aforedescribed systems. The pump portion of the assembly is of the reciprocating double-acting type and comprises a pumping cylinder 44 clamped between two cylinder heads 46 and 48 by a series of bolts 50 (Figure 3) which extend through both of the heads. Also clamped between the cylinder heads 46 and 48 on opposite sides of the pumping cylinder 44 are an inlet manifold 52 and an outlet manifold 54. Inlet passageways 56 in both of the cylinder heads 46 and 48 provide communication between both ends of the inlet manifold 52 and the corresponding opposite ends of the pumping cylinder 44, while outlet passageways 58 in the cylinder heads provide communication between both ends of the pumping cylinder and the corresponding opposite ends of the outlet manifold 54. Inlet check valves 60 are clamped between each end of the inlet manifold 52 and the corresponding cylinder head, and outlet check valves 62 are clamped between each end of the outlet manifold 54 and the corresponding cylinder head. The inlet manifold 52 is provided with an interiorly threaded fitting 64 for connection of the suction line or hose 24 thereto, while the outlet manifold 54 is provided with a T-fitting 66 for connection of the discharge line or hose to one end thereof and the direct connection of a needle valve 38 to its lateral outlet 68.

Reciprocable in the pumping cylinder 44 is a relatively conventional pumping piston or plunger 70 having a pump rod 72 secured thereto which passes through the cylinder head 48 and is sealed by a stuffing box 74 secured to the inner side of the cylinder head.

Clamped to the outside of the cylinder head 48 in alignment with the pump rod 72 and in the following order are a motor cylinder 76, a motor cylinder head or valve block or chest 78 containing a motor-operating valve, described in detail hereinafter, and a detent housing 80. Bolts 82 extend through a flange 84 on the detent housing 80 (Figure 3), freely through apertures in the valve block 78, exteriorly alongside the pumping cylinder 76 and into tapped apertures in the cylinder head 48 to firmly secure the detent housing, the valve block, and the motor cylinder to the cylinder head 48. The pump rod 72 projects into the motor cylinder 76 and has an enlarged exteriorly threaded head 86 thereon. Threaded onto the head 86 is a two-part motor piston 88 equipped with conventional cup washers 90 and dividing the cylinder into two chambers 92 and 94. Preferably, the cylinder head 48 is recessed, as at 96, for reception of the head 86 on the pump rod 72 at one extreme of its stroke.

It thus will be seen that reciprocation of the motor piston 88, as later explained, will correspondingly reciprocate the pump plunger 70 to operate the pump.

Slidable in an elongated axial recess 98 in the pump rod head 86 is a nut 100 comprising an enlargement on the end of a valve-shifter rod 102. One part of the piston 88 has a flange 104 overhanging the open end of the recess 98 to form an abutment for the nut 100. Consequently, the rod 102 has lost-motion connection with the piston 88. The valve shifter rod 102 extends coaxially through an enlarged bore 106 (Figure 5) in the valve block 78, an even larger bore 108 in the detent housing 80, and projects exteriorly through an elongated tubular cap 110 secured to the detent housing by screws 112. The rod 102 is sealed where it passes through the cap 110 by an O-ring 114, and where it passes into the valve block 78 from the motor chamber 94 by a stuffing box 116 secured to the valve block by screws 118.

Stacked in the enlarged bore 106 of the block 78 in the following order are an abutment plate 120 engaging the stuffing box 116, four annular rings 122, 124, 126, and 128, each provided with a circumferential series of radial ports 130, and an annular retainer plate 132 which is secured, as by screws 134, to the valve block 78. The plate 120, rings 122—128, and plate 132 form a cylindrical valve chamber 136 for a reciprocable tubular valve spool 138. The opposed ends of the abutment plate 120 and the ported rings 122—128 are provided with circumferential grooves within which O-rings 140 are disposed. These rings 140 are of sufficient inner diameter to project slightly within the valve chamber 136 and sealingly engage two spaced lands 142 on the spool 138. The lands 142 preferably have bevelled edges to avoid damaging the O-rings 140 and, as shown in Figure 5, are spaced to seal with alternate O-rings simultaneously so that the annular space 144 between the two lands will overlap the ports 130 of two adjacent rings. The valve spool 138 is also provided with radial ports 146.

The bore 106 of the valve block 78 is provided with four circumferential grooves 148, 150, 152, and 154, one surrounding the ports 130 of each ring. The groove 148 communicates with the motor chamber 92, via a passageway 156 in the block 78, a tube 158 clamped between the block and the cylinder head 48, and a passageway 160 in the cylinder head 48, while the groove 152 communicates with the motor chamber 94, via a passageway 162 in the valve block 78 and in the stuffing box 116. A tapped passageway 164 in the valve block 78 communicates with the groove 150 for the connection of a power fluid line thereto, while a tapped passageway 166 in the block 78 communicates with the groove 154 for connection of a swivelling exhaust pipe 168 (Figure 3) thereto. As shown best in Figure 3, power fluid is supplied to the passageway 164 by a hose or power supply line 36 connected to the needle valve 38 and to the inlet of the pressure regulator 40. The pressure regulator 40 preferably is mounted on the block 78 by a nipple 170 threaded into the passageway 164 in the block and into the outlet of the regulator. The assembly may also include a pressure gauge 172 mounted on the regulator 40 for ready determination of motor inlet pressure.

It will be seen that when the valve spool 138 is in the position shown in Figures 4 and 5, power fluid will flow through the passageway 164, the groove 150, the ports 130 in the ring 124, the annular space 144 between the two lands 142, the ports 130 in the ring 126, the passageway 162, and into the motor chamber 94. At the same time, the motor chamber 92 is exhausted to atmosphere, via the passageway 160 in the cylinder head 48, the tube 158, the passageway 156 in the valve block 78, the groove 148, the ports 130 in the ring 122, the annular space 174 between the valve shifter rod 102 and the interior of the valve spool 138, the radial ports 146 in the valve spool, the ports 130 in the ring 128, the passageway 166 in the valve block, and the swivelling exhaust pipe 168. Hence, the motor piston 88 will move to the left, as shown in the drawings. It will be seen that, if the valve spool 138 is shifted to the left, as shown in the drawings, until it abuts the abutment plate 120, power fluid will be admitted to the motor chamber 92 while the motor chamber 94 will be exhausted, thus causing the motor piston 88 to be moved to the right.

Such shifting movements of the valve spool 138 between its two positions are accomplished at both ends of the stroke of the motor piston 88 by the lost-motion connection of the valve-shifter rod 102 therewith. A rigid connection between the valve-shifter rod 102 and the valve spool 138 cannot be had, however, because in that event the piston 88 would move the spool to an intermediate or dead-center position, wherein both motor chambers 92 and 94 would be in communication with both the supply and exhaust passageways 164 and 166 simultaneously. Accordingly, a spring-loading connection is employed between the valve-shifter rod 102 and the valve spool 138, and the latter is provided with detents to retain it in either of its two positions. Consequently, when the valve-shifter rod 102 moves a predetermined distance and the spring-loading connection between the rod and the valve spool 138 builds up a force sufficient to overcome the restraint of the detents, the valve spool rapidly snaps from one position to the other.

The structure for accomplishing the foregoing snap action of the valve spool 138 comprises a detent sleeve 176 reciprocable in the bore 108 of the detent housing 80 and retained therein by an annular abutment plug 178. The sleeve 176 has two spaced circumferential grooves 180 corresponding to the two positions of the spool 138 engageable by spring-pressed ball detents 182 mounted in the side wall of the bore 108. The sleeve 176 is rigidly secured to the valve spool 138 by a snap ring 184 engaging a flange 186 on the valve spool which, together with a corresponding flange 188 on a spring housing 190, is disposed in a counterbore in one end of the detent sleeve 176. The spring housing 190 extends snugly through the sleeve 176 and into the cap 110 where its end is closed by a plug 192 held in place by a snap ring 194. Preferably, both the plug 192 and valve spool 138 are provided with cylindrical guiding extensions 196 and 198 which extend oppositely into the spring housing 190 and slidingly receive the valve-shifter rod 102. Interposed between the flange 186 on the valve spool 138 and an interiorly reduced washer 200 bearing against an interior circumferential central stop flange 202 in the spring housing 190 is a coil compression spring 204, while a similar spring 206 is interposed between the plug 192 and a similar washer 208 bearing against the opposite side of the flange 202. The valve-shifter rod 102 has a reduced portion 20 forming a shoulder 212 between the two washers 200 and 208. Seated against the shoulder 212 is an abutment washer 214 that is held in place by a sleeve 216 mounted on and substantially coextensive with the reduced portion 210 of the valve-shifter rod 102 and held thereon by a nut 218 threaded onto the end of the rod 102 exteriorly of the cap 110. Preferably, the extreme outer end of the valve-shifter rod 102 is square or otherwise suitably formed for the reception of a wrench (not shown), so that the rod can be prevented from rotating while the nut 218 is tightened.

It thus will be seen that, when the parts are in the positions shown in Figures 4 and 5 of the drawings, movement of the motor piston 88 to the left will ultimately move the valve-shifter rod 102 therewith and cause the abutment washer 214 to engage and begin to compress the spring 204. Further movement of the valve-shifter rod 102 builds up sufficient spring force to overcome the ball detents 182 and shift the detent sleeve 176 to the left against the abutment plate 132, thereby shifting the valve spool 138 to the left and causing reversal of the motor. Correspondingly, when the motor piston 88 moves to the right, the bottom of the axial recess 98 in the pump rod head 86 will ultimately engage the nut 100 on the valve-shifter rod 102 and move the latter to the right, thus causing engagement of the abutment washer 214 with the spring 206. Further movement of the valve-shifter rod 102 to the right by the motor piston 88 eventually builds up sufficient force in the spring 206 to overcome the detents 182 and to cause the detent sleeve 176, together with the valve spool 138, to be shifted to the right to thus again reverse the motor. In this connection, the guiding extensions 196 and 198 prevent their respective springs 206 and 204 from being compressed solid with possible resultant damage thereto.

The foregoing operation of the motor will continue to operate the pump, either as a compressor or as a liquid pump as aforedescribed, until the desired quantity of pressurized normally-gaseous liquid has been transferred. During operation of the motor, the swivelling exhaust pipe 168 can be adjusted to direct the exhaust gas away from any nearby persons. If, by any chance, the valve spool 138 should happen to come to rest in a dead-center position and thus cause the motor to cease operation, as described above, that end of the valve-shifter rod 102 or sleeve 216 which projects out of the cap 110, can be grasped by an operator and moved sufficiently to snap the spool valve to either one of its two normal positions and thus cause the motor to resume operation. If desired, mounting brackets 220 for the assembly can be secured to the cylinder heads 46 and 48 by the bolts 50, as shown in Figure 3.

In operation of the system wherein the pump is utilized as a compressor, as illustrated in Figure 1, the needle valve 38 preferably is closed to stop the motor before the liquid level in the supply tank 12 reaches the lower end of the tube 28, i. e., the 85% full level of the tank, because the differential pressure between the field tank 10 and the supply tank will cause liquid to continue to flow through the transfer line 14 for a short time until such pressure differential is equalized. Even if, however, the motor should not be shut off before the liquid level in the supply tank 10 reaches the lower end of the tube 28, and as a result the pump draws liquid instead of gas from the supply tank and such liquid is supplied to the motor through the power-fluid supply line 36, the supply of a liquid instead of gas to the motor will not damage the latter in the least. The same holds true for the system which utilizes the pump as a liquid pump as illustrated in Figure 2. In that system, if the motor is not shut off when the liquid level in the tank 12 reaches the lower end of the tube 28 and as a consequence liquid rises into the line 42 and is supplied to the motor, no harm will result.

It thus will be seen that the objects of this invention have been fully and effectively accomplished. It will be realized, however, that the specific embodiment shown and described for the purpose of illustrating the principles of the invention is subject to change without departure from such principles. Therefore, this invention includes all modifications encompassed within the spirit and scope of the following claims.

I claim:

1. A method of transferring a pressurized normally-gaseous liquid from a first closed container to a second, the steps comprising: connecting a transfer line to the first container below the liquid level therein and to the second container; connecting the suction and discharge lines of a pump respectively to the second container above the liquid level therein and to the first container; driving the pump by a fluid-pressure motor; and driving the motor by expanding therethrough, and exhausting to atmosphere, the pressurized gas present above the liquid level in one of the containers, whereby the pump creates a pressure differential between the two containers which forces liquid from the first container to the second through the transfer line.

2. The method defined in claim 1 in which the motor is supplied with gas substantially at the pressure existing in the first container.

3. A system for transferring a pressurized normally-gaseous liquid from a first closed container to a second comprising: a pump having suction and discharge lines connected respectively to the second container above the liquid level therein and to the first container; a fluid-pressure motor for driving said pump; means for supplying said motor with gaseous operating pressure from one of the containers and for operating said motor by the pressure differential existing between said gaseous operating pressure and the atmosphere; and a liquid transfer line connected to the first container below the liquid level therein and to the second container, whereby operation of said pump creates a pressure differential between the interiors of the containers above the liquid levels therein which forces liquid from the first container to the second through said transfer line.

4. The system defined in claim 3 in which the motor is supplied with operating pressure substantially equal to that existing in the first container.

5. The system defined in claim 3 in which the supplying means includes a motor supply line connected to the discharge line.

6. The system defined in claim 5 in which the supplying means includes a throttle valve.

7. The system defined in claim 5 in which the supplying means includes a pressure regulator for supplying operating fluid to the motor at a substantially constant pressure.

8. A system for transferring a normally-gaseous pressurized liquid from one closed container to another, comprising: a pump connected to transfer liquid from the first container to the second; a fluid pressure motor for driving said pump; a pressure-equalizing line connecting the containers; and means for supplying said motor with gaseous power fluid from that existing above the liquid levels in the containers.

9. The system defined in claim 8 in which the supplying means includes a pressure regulator.

References Cited in the file of this patent

UNITED STATES PATENTS

| | | |
|---|---|---|
| Re. 19,054 | Heylandt | Jan. 16, 1934 |
| 525,731 | Walther | Sept. 11, 1894 |
| 928,215 | Pickering | July 13, 1909 |
| 2,467,413 | Wildhack | Apr. 19, 1949 |
| 2,487,863 | Garretson | Nov. 15, 1949 |
| 2,502,525 | Krugler | Apr. 4, 1950 |

FOREIGN PATENTS

| | | |
|---|---|---|
| 375,479 | Great Britain | June 30, 1932 |
| 683,153 | Germany | Oct. 31, 1939 |